Jan. 10, 1939.  G. W. DUNCAN  2,143,305
ANIMAL TRAP
Filed May 10, 1937
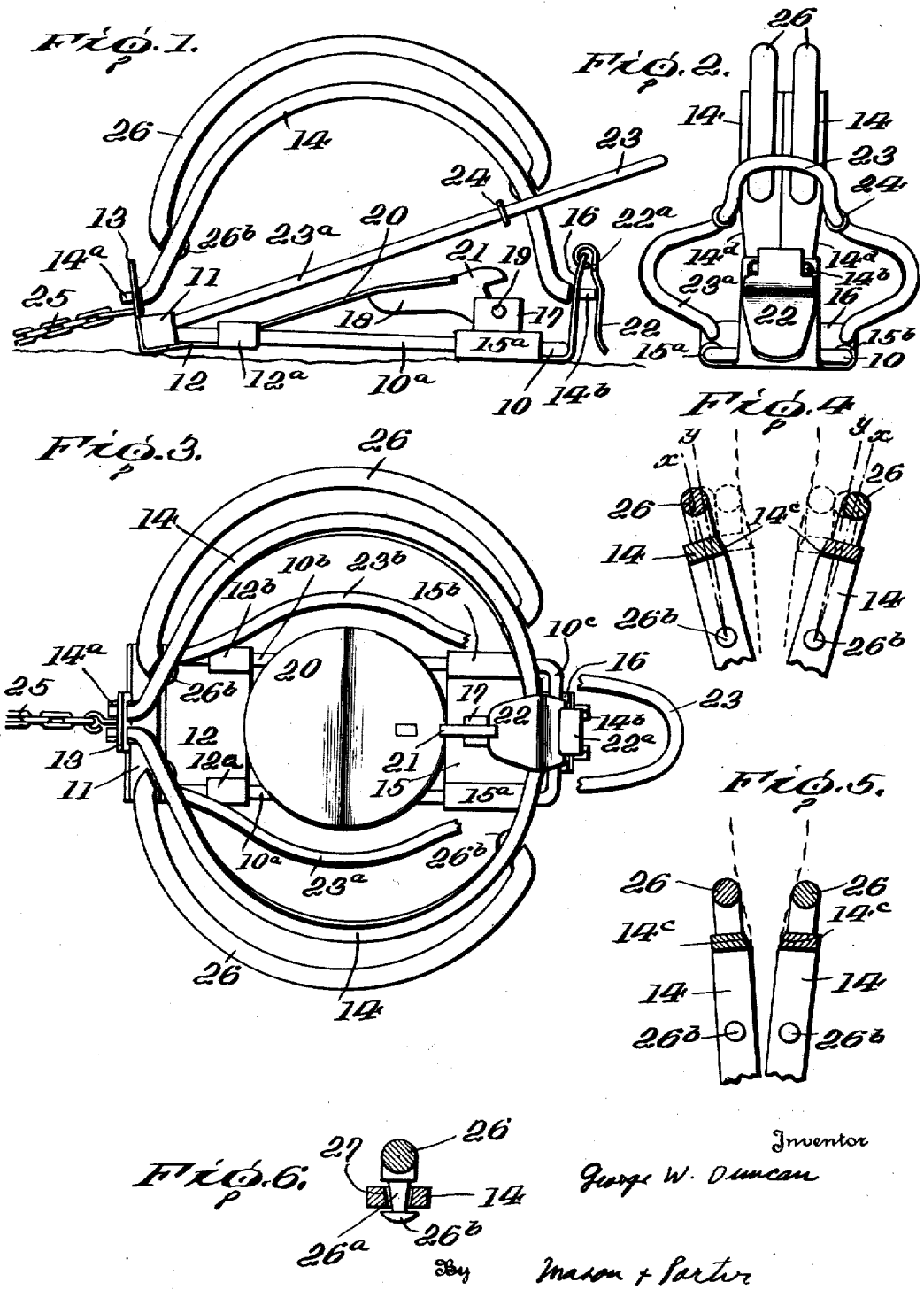

Patented Jan. 10, 1939

2,143,305

UNITED STATES PATENT OFFICE 2,143,305

ANIMAL TRAP

George W. Duncan, Shelltown, Md.

Application May 10, 1937, Serial No. 141,843

4 Claims. (Cl. 43—90)

The present invention relates to new and useful improvements in animal traps and more particularly to improvements in a trap having pivoted spring-operated jaws for trapping animals, such as muskrats and the like.

An object of the invention is to provide a trap, of the above type, wherein the jaws operate to firmly clamp the leg of the trapped animal without breaking the leg.

A further object of the invention is to provide a trap, of the above type, wherein the force of the jaws tending to break the leg of the animal is lessened by the employment of blow distributors carried by the jaws.

A still further object of the invention is to provide a trap, of the above type, wherein the blow distributors operate to cushion or distribute the initial force of the jaws in striking the leg but which permit the subsequent firm clamping of the leg of the animal.

A still further object of the invention is to provide an animal trap wherein the spring for closing the pivoted jaws, when the trap is sprung, is positioned and shaped so as not to interfere with the proper and efficient operation of the trap.

The invention still further aims to provide an animal trap, of the above type, which is simple in construction, and which is easy to operate and efficient in use.

The above and other objects of the invention will in part be obvious and will be hereinafter more fully pointed out.

In the accompanying drawing:

Fig. 1 is a side elevation showing the trap in closed or sprung position.

Fig. 2 is an end view of the trap shown in Fig. 1.

Fig. 3 is a top plan view showing the trap in open or set position.

Fig. 4 is a fragmentary detail view showing, in full lines, the position of the jaws and blow distributors while moving toward closed position, and, in dotted lines, the position of the jaws and blow distributors when the jaws first strike the leg of the animal.

Fig. 5 is a fragmentary view, similar to Fig. 4, showing the position of the jaws and blow distributors when in a sprung or closed position.

Fig. 6 is a fragmentary detail view showing the pivotal connection between the jaws and the blow distributors.

It has been found in trapping animals, such as muskrats or the like, that, where the leg of the animal is broken either by the force of the clamping jaws or by the threshing around of the animal after being caught, the animal will often gnaw through the flesh at the break and thus escape. It has also been found that some animals will gnaw through the flesh and the bone, if not broken, and, in these instances, the animal will sever the leg at or above the joint where the pressure, and consequently the pain, is greatest.

According to the present invention, there is provided a trap which will effectively and firmly clamp the leg of the animal without breaking the leg and one which will prevent the animal from severing the leg and thus escaping. To this end, the trap includes a pair of pivoted jaws above each of which is disposed a member which is pivoted to the jaw. Each of these pivoted members has a free pivotal movement with respect to the jaws within definite limits. When the trap is sprung and the jaws move rapidly toward closed position, the pivoted members, or blow distributors, will lag behind and, upon contact of the jaws with the leg of the animal, the blow distributors will be caused to move toward one another independently of the jaws and to strike the leg of the animal above the jaws, thus lessening the force of the jaws tending to break the leg. After this initial distribution or cushioning of the force of the jaws, the jaws will continue to bite into the leg of the animal, thus firmly clamping the leg without breaking. During this further clamping movement of the jaws, the blow distributors will move outwardly to the outer limit of their pivotal movement, in which position they will also clamp the leg of the animal above the point where the jaws are clamped.

Referring more in detail to the accompanying drawing, the trap is provided with a skeleton base which includes a skeleton wire frame 10, the free ends of the leg portions 10a, 10b of which are embedded in and secured to a block 11 carried by a bracket 12. The bracket 12 is provided with retaining lugs 12a, 12b which are curled over the legs 10a, 10b of the wire frame. The bracket 12 is also provided with an upstanding portion 13 at one end thereof in which the ends 14a of the clamping jaws 14 are pivoted. Adjacent the closed end 10c of the wire frame 10 is a bracket 15 which is provided with retaining lugs 15a, 15b engaging the legs 10a, 10b, respectively of the wire frame. The bracket 15 also has an upstanding portion 16 at one end thereof in which the ends 14b of the jaws 14 are pivoted.

A pair of ears 17 in the form of a supporting member are secured to the bracket 15 and extend upwardly therefrom. A lever 18 is pivoted, as at 19, to the ears 17 and carries a trip or treadle 20 which is disposed centrally of the trap. A portion 21 of the lever 20 is shaped to provide a latch for engaging a tongue 22 to thus provide a trigger mechanism for controlling the operation of the trap. The tongue 22 is provided with a curled portion 22a which extends through an aperture in the end of the upstanding portion 16 or the bracket 15 and thus affords a hinged connection for the tongue.

A strong spring 23 is provided with leg portions 23a, 23b, the free ends of which are rigidly secured in the block 11 above the ends of the legs 10a, 10b of the skeleton wire frame 10. The leg portions 23a, 23b of the spring 23 are extended outwardly intermediate the ends thereof so that the spring is disposed entirely outside of the treadle 20. The outwardly bent portions of the spring 23 approach one another adjacent the jaws 14 and are connected at this point by a clip 24. The leg portions of the spring then extend beyond the jaws on the outside thereof and merge into the closed end 23c of the spring. The closed end of the spring provides sufficient space for the tongue 22 to be manipulated. It will be thus seen that the spring 23 extends from one end of the trap to and beyond the opposite end thereof and lies outside of the working parts of the trap, so as not to interfere with the operation thereof. The usual chain 25 is universally secured to the portion 13 of the bracket 12 to anchor the trap in order to prevent its being dragged away by the animal.

Each of the jaws 14 carries a member 26, the ends 26a of which extend through holes 27 in the jaws and are headed, as at 26b, to prevent removal thereof from the jaws. As indicated in Fig. 6 of the drawing, there is small space left between the ends 26a of the members 26 and the jaws 14, thus permitting limited movement of the members 26 with respect to the jaws. This pivotal movement of the members 26 on the jaws 14 is a free pivotal movement within the limits provided by the connection between the ends of the members 26 and the jaws 14. The adjacent edges of the jaws 14 are tapered downwardly and toward each other, as at 14c, so that any effort to draw the trapped leg from the jaws will tend to tighten the hold thereon.

In setting the trap, the jaws 14 are spread against the action of the spring 23, the leg portions of which bear against the tapered outer edges 14d on the jaws 14. When the jaws are opened to the position shown in Fig. 3, the tongue 22 is swung about its pivot on the bracket 15 so that the latch 21 will engage the edge thereof when the treadle 20 is raised. Thus, the latch and tongue serve as a trigger mechanism to maintain the jaws 14 open against the tendency of the spring 23 to normally force the jaws together. When the animal steps on the treadle 20, the latch 21 will release the tongue 22 and permit the spring 23, bearing against the edges 14d, to force the jaws 14 toward one another. The closing movement of the jaws 14 flips the tongue 22 out of the path thereof.

During the closing movement of the jaws, the members 26 will lag behind and be carried by the jaws at the limits of their outward pivotal movement, as shown by the full lines in Fig. 4. The limit of the pivotal movement of the members 26 is indicated by the lines $x$ and $y$ in Fig. 4. When the jaws first strike the leg of the animal, this retarding of the movement thereof will cause the members 26 to move forward relative to the jaws and strike the leg of the animal above the jaws, as shown by the dotted lines in Fig. 4. The members 26 striking the leg of the animal serve to lessen the force of the jaws 14 so as to prevent breaking of the leg. The members 26, which thus serve as blow distributors, being free now to move outwardly relative to the jaws 14, do not prevent the continued forward movement of the jaws to effect a firm clamping of the leg between the tapered faces 14c. When the jaws have firmly clamped the leg of the animal, the blow distributors will be disposed at the limit of their outward movement so that they too will now serve to additionally clamp the leg of the animal above the point where the leg is clamped by the jaws.

From the foregoing description, it will be readily seen that the present invention provides an efficient and simply operated trap wherein the actuating means for the pivoted jaws is in the form of a flat spring, the leg portions of which are shaped to lie outside of the working or operating parts of the trap. The blow distributors serve to prevent breaking of the leg of the animal by the jaws and also serve to prevent the animal from gnawing and severing the leg above the joint of maximum pressure, that is, above the jaws.

It is to be clearly understood that various changes in details of construction and arrangement of parts may be made without departing from the scope of the invention as set forth in the appended claims.

What I claim is:

1. An animal trap comprising a pair of pivoted jaws, actuating mechanism for the jaws, control means for maintaining the jaws open, a pair of blow distributors, one carried by and above each of said jaws, and means for mounting said blow distributors on said jaws for free pivotal movement independently of the jaws within predetermined limits and entirely independently of said actuating mechanism, said blow distributors being adapted to move toward one another by inertia into contact with the leg of the trapped animal when the jaws first strike the leg whereby to lessen the breaking force of the jaws.

2. An animal trap comprising a pair of pivoted jaws, actuating mechanism for the jaws, control means for maintaining the jaws open, a pair of blow distributors having reduced ends, said jaws having openings therethrough for receiving the reduced ends of said blow distributors and permitting free pivotal movement of the blow distributors independently of the jaws within the limits of movement permitted by the connection therewith, said blow distributors being adapted to move toward one another by inertia entirely independently of said actuating mechanism into contact with the leg of the trapped animal when the jaws first strike the leg whereby to lessen the breaking force of the jaws.

3. An animal trap comprising a skeleton base including substantially parallel wire leg portions, a pair of brackets, one secured to each end of said skeleton base and engaging the said leg portions, said brackets having upstanding end portions, a pair of jaws pivotally mounted on said upstanding end portions, spring actuating mechanism for said jaws, and a control mechanism including a trigger pivotally mounted on one of said brackets for engaging and maintaining the jaws open against the action of said spring actuating mechanism.

4. An animal trap comprising a skeleton base including substantially parallel wire leg portions, a pair of brackets, one secured to each end of said skeleton base and engaging the said leg portions, said brackets having upstanding end portions, a pair of jaws pivotally mounted on said end portions, a spring having an unsecured closed end disposed outside of one end of said base and a pair of leg portions secured to one of said brackets at the opposite end of said base and abutting against the outer edges of said jaws adjacent the said closed end, the leg portions of said spring being bent outwardly intermediate the ends thereof and within the ends of said jaws, and a trigger mechanism including a treadle disposed entirely within the outwardly bent leg portions of said spring and a tongue for engaging the treadle and said jaws for maintaining the jaws open against the action of said spring.

GEORGE W. DUNCAN.